G. H. MOLL.
DIFFUSER FOR ELECTRIC FANS.
APPLICATION FILED JULY 14, 1913.
1,114,015.
Patented Oct. 20, 1914.
2 SHEETS—SHEET 1.
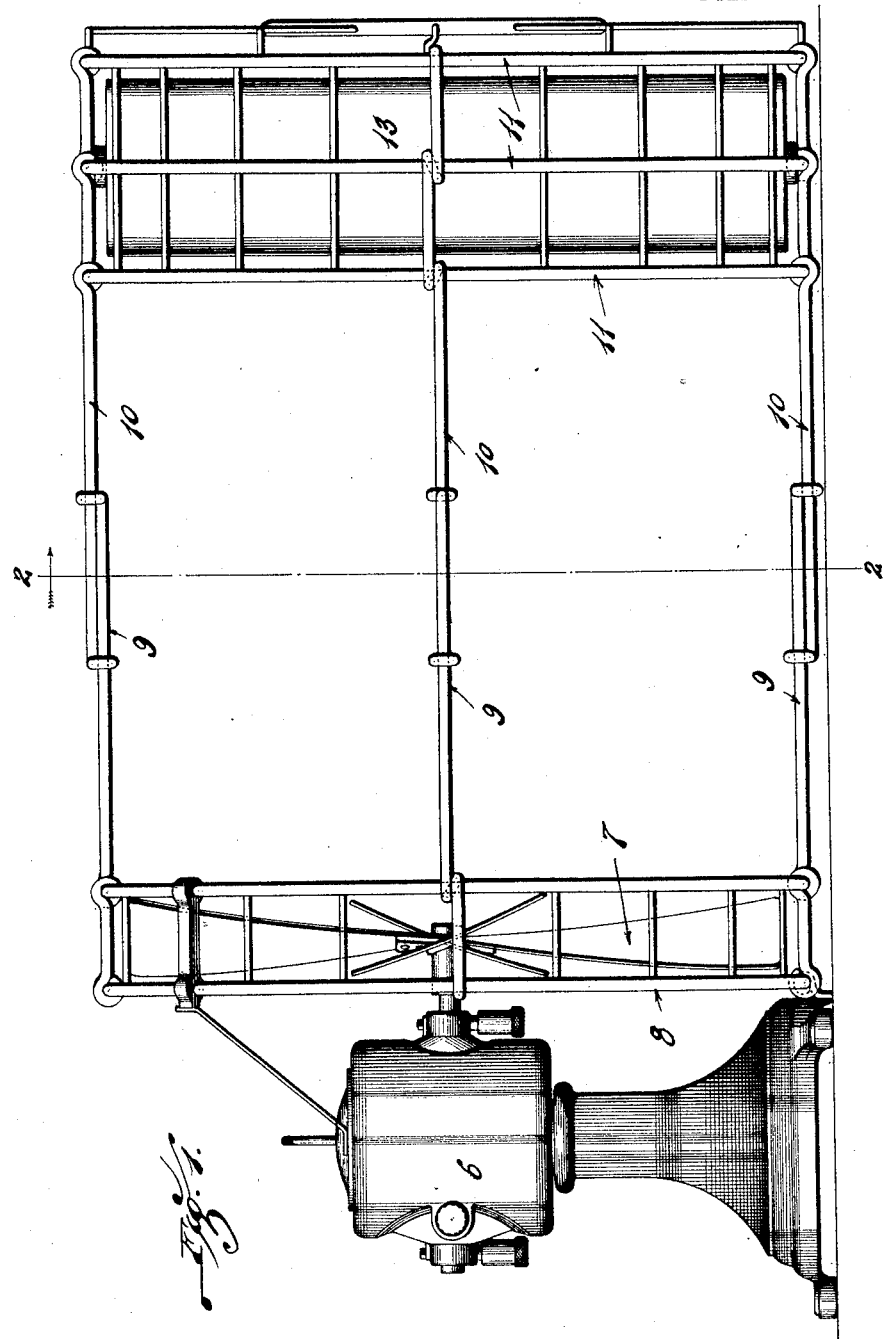

G. H. MOLL.
DIFFUSER FOR ELECTRIC FANS.
APPLICATION FILED JULY 14, 1913.
1,114,015.
Patented Oct. 20, 1914.
2 SHEETS—SHEET 2.
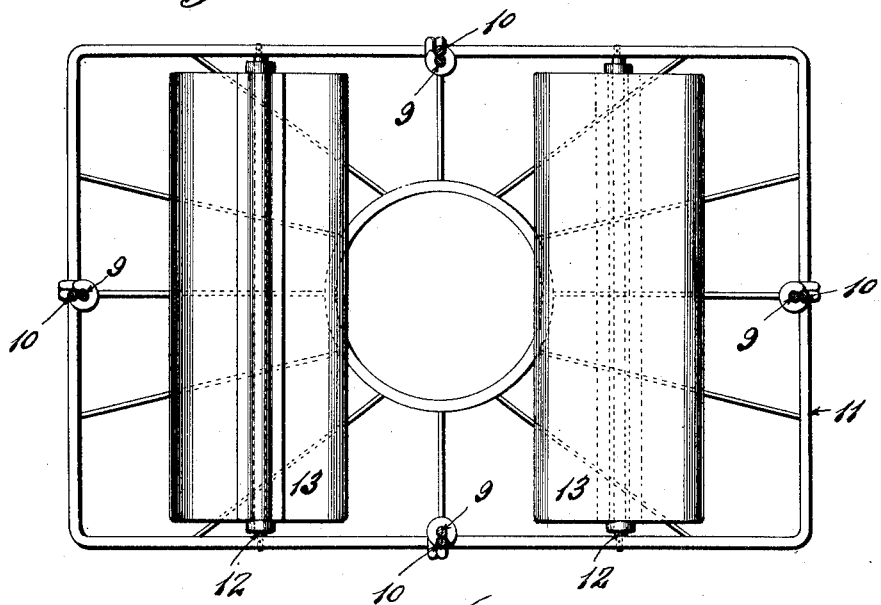
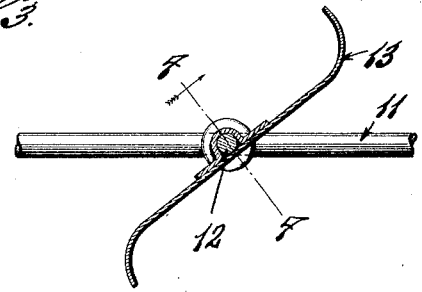
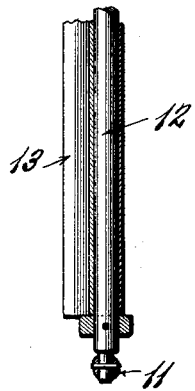
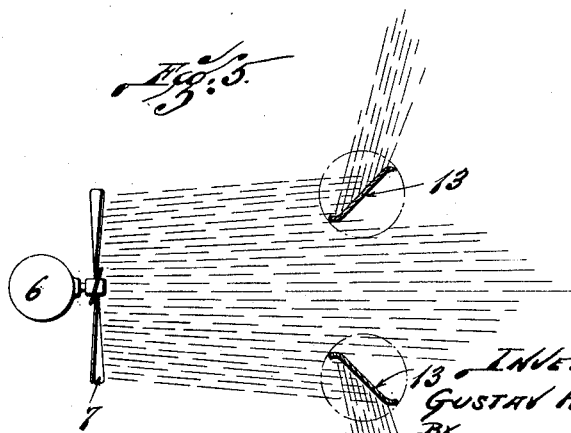
INVENTOR
GUSTAV H. MOLL,

UNITED STATES PATENT OFFICE.

GUSTAV H. MOLL, OF ST. LOUIS, MISSOURI.

DIFFUSER FOR ELECTRIC FANS.

1,114,015.   Specification of Letters Patent.   Patented Oct. 20, 1914.

Application filed July 14, 1913. Serial No. 778,980.

*To all whom it may concern:*

Be it known that I, GUSTAV H. MOLL, a citizen of the United States, and resident of St. Louis, Missouri, have invented certain new and useful Improvements in Diffusers for Electric Fans, of which the following is a specification containing a full, clear, and exact description, reference being had to the accompanying drawings, forming a part hereof.

My invention relates to improvements in diffusers for electric fans, and the object of my invention is to construct a device in the form of a rotating blade arranged to be positioned in the path of air issuing from a blast fan whereby to serve as a deflector to direct the air from the blast out of its regular course and thereby render an ordinary fan more efficient and capable of covering a larger area.

With the above purposes in view my invention consists in certain novel features of construction and arrangement of parts as will be hereinafter more fully described, pointed out in the claim and illustrated by the accompanying drawing, in which—

Figure 1 shows in elevation a device constructed according to my invention in the form of an attachment to an electric fan; Fig. 2 is a face view of the device of my invention, the supporting rods thereof being shown in section and the view taken on the line 2—2 of Fig. 1; Fig. 3 is a detail sectional plan of one of the blades and its support; Fig. 4 is a fragmental vertical section taken on the line 4—4 of Fig. 3; and Fig. 5 is a diagrammatical plan showing an ordinary electric fan, the arrangement of a pair of diffusing fans and various of the angles at which air may be diverted by the diffusing fans.

As shown in the drawings and will be described in detail hereinafter the device of my invention is in the form of an attachment to an electric fan, but I do not wish to be understood as limiting myself to the structure as shown and described as I contemplate making the device in various forms and not necessarily attached to the primary fan or source of air current.

In the accompanying drawings the numeral 6 indicates an ordinary electric fan having the usual rotating blades 7 and guard 8. Projecting forwardly and secured to the guard 8 is a plurality of arms 9 and slidably connected with the arms 9 are the arms 10. Carried at the outer ends of the arms 10 is a guard 11, and disposed within said guard 11 is a pair of shafts 12. Supported by each of said shafts and arranged for rotation within the guard 11 is a blade 13 which may be constructed in an infinite variety of forms, but whose essential characteristic is that when it is subjected to a blast of air it will rotate.

The device of my invention is applicable to all forms of blast devices, however, I believe that it will be principally used in connection with electric fans, whether they be the fixed stationary type, the oscillating type or the rotating type.

The blast from a stationary fan covers only a limited area and is constant in a defined course. In oscillating and rotating fans the blast over a defined area is intermittent. By placing a diffusing fan constructed according to my invention in the path of the blast from either of the forms of primary fans noted, it is obvious that the said primary fan will be given a wider field of usefulness, in that the diffusing fan will deflect the blast out of its true course to a point or points out of the path of the direct blast from the fan.

By the provision of a rotating deflector having a vane or vanes provided with oblique faces, the rotation of the blade is entirely automatic, that is when the blast from a primary fan strikes an oblique face of one of the vanes the vane is caused to rotate, thus accomplishing the shifting of the deflector without the employment of extraneous shifting mechanism.

By the provision of the adjustable connection between the primary fan and the diffusing fan, the diffusing fan may be moved relative to the primary fan so that its speed of rotation will be varied according to the force of the blast from the primary fan.

I claim:

In combination with a power driven fan, a secondary fan comprising a blade mounted for rotation in the path of air from the power driven fan, said blade having a plane body portion provided at opposite margins with oppositely bent portions forming continuations of the plane body portion, whereby the plane body portion will be automatically rotated by the blast from the power driven fan to change the course of the blast.

In testimony whereof, I have signed my name to this specification, in presence of two subscribing witnesses.

GUSTAV H. MOLL.

Witnesses:
E. L. WALLACE,
JOHN C. HIGDON.

Copies of this patent may be obtained for five cents each, by addressing the "Commissioner of Patents, Washington, D. C."